Patented May 12, 1942

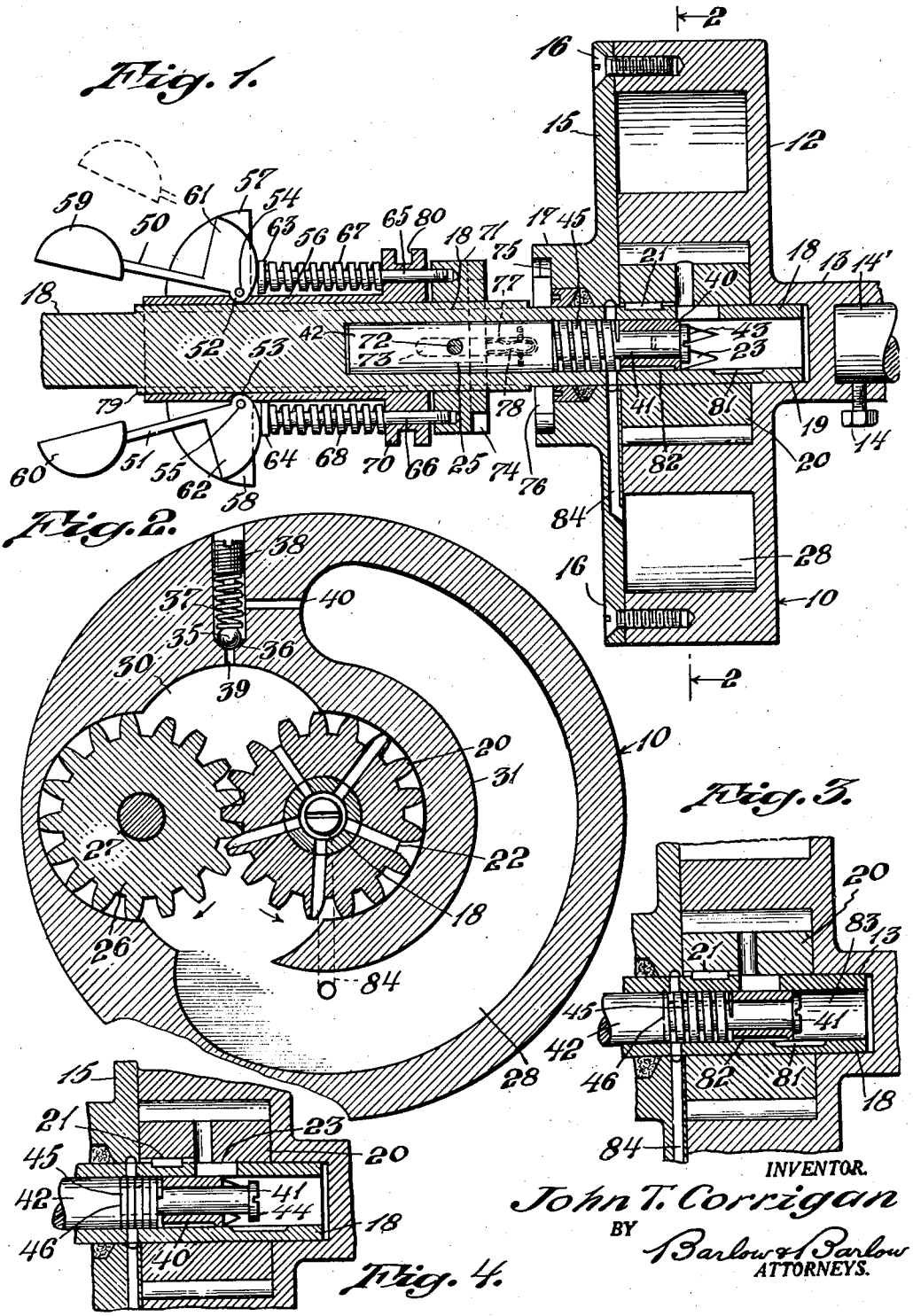

2,282,395

UNITED STATES PATENT OFFICE 2,282,395

HYDRAULIC TRANSMISSION

John T. Corrigan, Newport, R. I.

Application October 21, 1940, Serial No. 362,004

10 Claims. (Cl. 192—61)

This invention relates to hydraulic transmissions and, in particular, to a variable speed hydraulic transmission adaptable for variable speed connection between a driving member and a driven member, for example, such as for use in a motor vehicle, in which a plurality of power and speed transmission ratios are employed between the engine and the propeller shaft for propulsion of the vehicle; and has for one of its objects to provide a hydraulic power transmission in which a plurality of transmission ratios are automatically controlled by the speed of the vehicle and also the load to be driven.

Another object of the invention is to avoid breakage or undue strain on the driving and driven members of the transmission due to sudden acceleration of the vehicle when there is no direct coupling between the driving and driven members of the transmission or when the hydraulic control is cut out too quickly to transmit sufficient power to overcome the load to be driven.

Another object of the invention is the automatic operation of the control valve of the transmission for stopping the circulation of the pumped fluid when the speed of the driving member of the transmission reaches a predetermined rate to cause direct coupling of the driving and driven members of the transmission, and also the automatic shifting of the position of the control valve into an open position to effect the circulation of the fluid and provide a reduced transmission ratio if the hydraulic control is closed too quickly due to excessive speeds of the driving shaft of the transmission.

Another object of the invention is to provide means to prevent back pressure on the control valve for regulating fluid circulation and also to prevent leakage of fluid under pressure by returning the fluid back to the main supply reservoir.

Another object of the invention is the provision of a governor device for controlling the circulation of fluid and the speed of the driven member of the transmission, and also to provide means for allowing the fluid control valve to open wider under pressure of the load to be driven and to enable the driving member to run faster in proportion to the torque or load conditions.

With these and other objects in view, the invention consists of certain novel features of construction, as will be more fully described and particularly pointed out in the appended claims.

In the accompanying drawing:

Fig. 1 is a central longitudinal sectional view of a variable speed hydraulic transmission representing one embodiment of the invention;

Fig. 2 is a cross-sectional view taken on the line 2—2 of Fig. 1;

Fig. 3 is a fragmentary longitudinal sectional view of the transmission illustrated in Fig. 1 with the control valve being shown in a closed position by the action of the governor weights;

Fig. 4 is a fragmentary longitudinal sectional view similar to Fig. 3 showing the governor actuated valve stem in the same position but with the yieldable valve sleeve shifted axially along its stem in a direction toward the left of the figure for circulation of fluid through the pump gear and the port openings to enable the drive shaft to run faster than the driven shaft independently of the governor control of the valve when overload conditions occur.

The general arrangement of the fluid pumping system and mechanism shown and described herein except for its novel automatic control is similar in principle to the structure disclosed in Patent No. 2,191,340 granted February 20, 1940. In this patent, a hydraulic transmission mechanism is disclosed and briefly consists of a driven shaft which is rotated at different speed ratios from a driving shaft by the control of the circulation of fluid through radial passages in one of a pair of cooperating pump gears driven by the rotating driving shaft, in which the circulation of fluid is controlled by means of a manually shiftable reciprocatory valve or piston axially movable within a hollow driving shaft alternately into port-opening and port-closing positions to control the circulation of the pumped fluid out from a pressure chamber through passages in one of the pump gears into the main fluid supply reservoir.

In this prior construction above referred to, the direct coupling of the driving shaft with the driven shaft from a disconnected to a connected relationship has been wholly dependent upon the rapidity and/or smoothness with which manual shifting movement of the control valve or piston by the operator can be effected without causing stalling of the engine. While such a mode of operation is satisfactory, it is open to improvement, however, since there is no provision made in that prior transmission of a means to prevent the sudden and premature closure of the fluid control valve. This condition may result from the too rapid manual closing of the valve or the premature closure thereof by too sudden acceleration of the driving shaft before it can increase its rotational speed fast enough for establishing a direct drive of the two shafts and the transmission of sufficient power to drive the load encountered; and in order to avoid these difficulties, the present invention contemplates a hydraulic transmission of the above general structure in which the manual control if present will be a supplemental device or it may be dispensed with, and the main control for the reciprocatory valve or piston comprises a governor device automatically operated from the driving shaft of the transmission and responsive to the rate of rotation of the driving shaft for moving the control valve or piston into a position for blocking or stopping circulation of the fluid when the speed of the driving shaft reaches a predetermined rate to cause the rotation of the driven shaft at the same speed of rotation as the driving shaft.

As an additional feature, the main control valve or piston is arranged so as to be yieldable and be shiftable independently of the action of the governor so as to alter the valve position enforced by the action of the governor and uncover the valve ports to permit circulation of the fluid when the back pressure of the fluid caught in the space ahead of the valve and opposing its closing movement exceeds a predetermined value, and this yielding action of the valve will occur in a direction opposite to the normal closing movement of the valve by the governor in order that the driving member may be permitted to run faster than the driven member and at a speed in proportion to the existing torque and the load conditions without affecting the normal action of the governor device, and thereby avoid breakage or undue strain on the parts; and the following is a more detailed description of the present embodiment of this invention, illustrating the preferred means by which these advantageous results may be accomplished.

With reference to the drawing, 10 designates generally the outer casing member of the transmission which is of cylindrical shape closed at one end by an end wall 12 and having a hollow central hub 13 adapted to be suitably connected, as by means of a clamp bolt 14 or a key (not shown), to a driven shaft 14', such as for example the driving shaft of a motor vehicle. A removable cover plate 15 is secured over the open end of the casing 10 by means of studs 16, and the cover 15 is provided with a hollow central hub 17 through which projects interiorly of the casing 10 the driving shaft 18, the inner end of which hollow or tubular end is suitably journaled in a short circular bore 19 formed in the end wall 12 and the hub 13. A suitable stuffing box of any well-known construction is provided at the outer end of the bearing, and in conjunction with the oil groove 84 which will be hereinafter described in detail, serves to prevent leakage of liquid out of the bearing formed by the hub 17.

Mounted upon the end portion of the shaft 18 passing through the interior of the casing 10 is a pump gear 20 which is suitably fixed on the shaft 18 as by a key 21 so as to rotate with the shaft when the latter is rotated by the engine of the motor vehicle or other source of power. The pump gear 20 has a plurality of radially extending ducts or passages 22, the outer end openings of which connect with the pockets between the gear teeth, while the inner end openings communicate with a series of ports 23 spaced circumferentially around the hollow driving shaft 18 at equal intervals and are generally V-shaped to provide a graduated cut-off of the pumped fluid when closed by longitudinal shifting movement of the reciprocatory valve or piston generally designated 25, as is indicated in Fig. 1, the novel construction of which will be hereinafter more fully described.

The second pump element comprises a gear 26 which is loosely rotatable upon the stud 27 fixed to the back wall 12 of the casing 10 and meshes with the pump gear 20 so that when the latter is driven by the driving shaft 18 the pump gears 20 and 26 cooperate in a manner well understood to produce a circulation of fluid from the arcuate supply reservoir 28 or storage chamber, through the pump gear chamber into a pocket or pressure chamber 30 in which the pumped fluid is trapped and fluid pressure is built up due to closing of the graduated ports 23 by the sliding movement of the piston valve 25 in a direction inwardly of the casing so as to resist and/or prevent rotation of the pump gears 20 and 26 whereby the gears will finally become locked together against relative rotation and the casing 10 will be coupled to the driving shaft and will thereby revolve at the same speed to effect a direct drive between the driving and driven shafts 18 and 14' respectively. The gears 20 and 26 with the arcuate partition 31 divide the casing into two compartments, one of which forms the supply reservoir 28 and the other consisting of the pressure pocket or chamber 30.

A spring pressed ball safety valve 35 is seated at 36 and is loaded by a spring 37 which can be adjusted to give a varying pressure on the ball by means of the plug 38 so that the liquid under pressure in the pressure chamber 30 can find egress therefrom when the ports 23 are closed by the valve 25 by passing out from the chamber 30 through the ducts 39 and 40 which are controlled by the ball valve 35 and into the main supply reservoir when the pressure within the chamber 30 exceeds the spring pressure on the ball. To get maximum load transmission of the device, the ball 35 may be tightly locked in its seat by screwing down the plug 38 until its lower end strikes the top surface of the ball and forces it against its seat.

To automatically control the rate or speed of rotation of the casing with respect to the drive shaft 18 and also the speed and power transmission ratio in proportion to the load conditions, there is provided the reciprocable piston valve 25 which consists of a sleeve 40 slidably mounted upon the reduced end portion 41 of the valve rod 42 and secured in place thereon by the stud 43. The enlarged head 44 of the stud 43 forms an abutment against which the sleeve is normally urged into engagement by a spring 45 which encircles the reduced portion 41 and acts between the inner end face of the sleeve 40 and the shoulder 46 formed at the meeting point of the reduced portion 41 with the body of the valve rod 42. The main control of the valve or piston 25 consists of a fly-ball governor mechanism which is carried by the drive shaft 18 and consists of the arms 50 and 51 which are pivoted at one end by the ears 52 and 53 and the pins 54 and 55 respectively to a sleeve 56. The sleeve 56 is fixed on the drive shaft 18 for rotation therewith, as will be hereinafter described, and the arms 50 and 51 are arranged at diametrically opposite positions of the sleeve 56 for movement between the side plates 57 and 58 toward and from the drive shaft during its rotation.

Disposed at the free ends of the arms 50 and 51 are the fly-ball members 59 and 60 respectively, while integral with the pivoted end portions of the arms 50 and 51 are the cam members 61 and 62 which coact with the head members 63 and 64 at the free ends of the rods 65 and 66 and normally held against the cam surfaces of the cams 61 and 62 by the compression springs 67 and 68 between the heads 63 and 64 and a flange 70 integral with the sleeve 56. The rods 65 and 66 pass loosely through suitable holes in the flange 70 equidistant from the center thereof. These rods 65 and 66 have threaded connection with a collar 71 which is splined to and slidable upon the outer surface of the drive shaft 18 and is fixedly connected with the stem 42 by means of a pin 72 or the equivalent reciprocable within the slots 73 at diametrically opposed portions of the side walls of the drive shaft, whereby reciprocatory motion will be imparted to the valve stem 42 by the action of the governor on the rods 65 and 66, collar 71 and pin 72.

The springs 67 and 68 normally have a tendency to maintain the valve 25 in its open position as shown in Fig. 1 when the drive shaft 18 is stopped, but the outward movement of the fly balls 59 and 60 will move the valve 25 toward its closed position as shown in Fig. 3 as the drive shaft is rotated and will close the ports 23 completely when the drive shaft has attained sufficient speed to move the valve sleeve 40 into the position represented in Fig. 3 and thus shut off the circulation of the pumped liquid through the passages 22 in the pump gear 20 in its egress from the pressure chamber 30 into the main fluid supply reservoir 28. When the drive shaft 18 has attained its normal speed of rotation during running of the vehicle, the sleeve 40 of the piston valve 25 will entirely close the ports 23, as indicated in Fig. 3, and the teeth 74 on the collar 69 will be forced by the action of the governor into intermeshing engagement with the teeth 75 arranged internally about the side wall of the chamber 76 of the hub 17 and a direct drive between the drive shaft 18 and the casing 12 will be established. Positioned in each of the slots 73 is a U-shaped spring 77, which in Fig. 1 is shown of exaggerated thickness, and the opposite side arms of this spring bear against the top and bottom walls of the slot 73. Formed in the intermediate portion of the arms of the spring 77 in an opposed relationship are the convexedly curved portions 78 which yield in the direction of the top and bottom walls of the slot 73 as the pin 72 is moved past the convex portions 78 during the normal closing movement of the piston valve 25. The convexed portions 78 are arranged to form a restricted opening behind the pin 72, when thus positioned, to retain it in place and maintain the teeth 74 and 75 in intermeshing engagement and prevent accidental disengagement thereof after direct coupling of the teeth has been established.

If, however, the speed of rotation of the drive shaft 18 is suddenly increased to a speed faster than that to which the driven shaft 14' can be rotated under the load conditions existing at the time, as by accelerating the engine too fast from its idling speed or from a quick start, the weighted ends of the arms 50 and 51 will be suddenly thrown outward by centrifugal action and, as a result, the valve rod 42 and the sleeve 40 carried thereon will be moved in an axial direction to close the ports 23 of the drive shaft 18 during which port-closing movement the sleeve 40 will tend to be moved bodily with the rod 42 from the open port position shown in Fig. 1 into the closed port position represented in Fig. 3.

The sleeve 40, however, will not complete its movement in this direction along with the valve rod due to the fact that the liquid discharged from the pocket 30 will be trapped in the space 83 of the inner hollow end of the drive shaft 18 between the front face of the sleeve 40 and the back wall of the casing and will thus act to provide a resistance to oppose the inward movement of the sleeve 40 and the valve rod 42 to close the ports 23. Since the trapped liquid in the space 83 is unable to escape fast enough through the ducts 81 and 82, chamber 85 and passage 84 to prevent back-pressure from building up on the space 83 ahead of the sleeve 40, and also due to the fact that this suddenly increased speed of the drive shaft 18 will rotate the pump gears for an instant with greater rapidity to suddenly increase the pressure of the liquid being pumped into the pocket 30, the final effect of which will be to retard the pump gears, the back pressure of the liquid in the space 83 thus will act to prevent the complete port-closing movement of the sleeve 40 so that it will be stopped in an intermediate position, such as that represented in Fig. 4, at the instant a balance is reached between the force of the spring 45 and the back-pressure of the liquid opposing the closing movement of the valve. Consequently, further inward movement of the rod 42 under the action of the weighted arms will result in compressing the spring 45. The sleeve 40 will be maintained in the position shown in Fig. 4 with the ports 23 partially open to enable circulation of the liquid, until such time that sufficient driving torque is transmitted to the driven shaft 14' to cause it to rotate the load encountered. As the speed of the driven shaft increases, the sleeve 40 will gradually close the ports 23 so that, when a normal speed for a direct drive is reached, the ports 23 will be fully closed. Thus, the transmission of power from the drive shaft 18 to the driven shaft 14' will be gradual under these conditions, and no sudden strain will be imposed on the engine or on the transmission mechanism.

In the form of the invention shown in Fig. 1, the sleeve 56 is shown as being connected to the drive shaft 18 by a series of splines 79 which are provided on the drive shaft and cooperate with complementary grooves formed in the sleeve 56 whereby it may be manually shifted and moved in a direction longitudinally of the drive shaft 18 entirely independent of the action of the flyball governor mechanism by means of a manual shift lever device (not shown) of the type provided with a fork for engaging the annular groove 80 in the flange 70 so as to reciprocate the valve rod 42 and the sleeve 40 within the bore of the drive shaft 18 to move the sleeve 40 into and out of partial or complete port-closure positions. In the normal operation of the governor mechanism, the sleeve 56 is held against relative axial movement on the drive shaft 18 by the action of any of the usual spring-pressed detent means which serve for holding the manual control lever locked in a neutral position, such devices being of well known construction and commonly used in the ordinary gear shift mechanism of automobiles for resilient holding of the gear shift lever in any of its selectively adjusted positions.

Ducts 81 and 82 are provided in the side wall of the bore of the drive shaft 18 and in the outer cylindrical surface of the valve sleeve 40 respectively, which ducts communicate with each other to vent fluid out from the space 83 between the front end of the valve stem 42 and the back wall of the casing only during gradual closing movement of the valve by the action of the weighted arms 50 and 51 as the speed of the drive shaft is gradually accelerated. Only under such conditions can fluid flow from the space 83 through the vertical passage 84 in the cover plate 15 to be discharged into the main fluid supply reservoir 28 and thereby prevent back pressure on the valve during its closing movements, and also serve to prevent loss of the fluid by returning it to the supply reservoir 28.

It will therefore be apparent from the above description that in accordance with the invention, there is provided a valve mechanism the arrangement of which is such that upon a sudden burst of speed or overload the valve sleeve 40 will yield from a port closing position to take up the shock of the rapid inward thrust of the sleeve by the sudden outward opening of the governor and thus relieve the abnormal and suddenly applied pressure to counteract the action of the governor.

The foregoing description is directed solely towards the construction illustrated, but it is desired to be understood that the privilege is reserved of resorting to all the mechanical changes to which the device is susceptible limited only by the scope of the appended claims.

I claim:

1. In a hydraulic power transmission, a casing constructed to form a receptacle for a fluid, a driven shaft affixed to said casing, a driving shaft extending into said casing, means carried by said shafts for circulating fluid within the casing when relative rotation of said shafts occurs, a valve for controlling the circulation of the fluid, and automatic means external of the casing actuated by the rotational speed of the driving shaft for closing said valve when the speed of the driving shaft is increased up to a predetermined rate to cause the rotation of said driven shaft at the same rate of speed as said driving shaft, said valve being automatically yieldable when subjected to pressure above a predetermined pressure for allowing the circulation of the fluid and rendering the action of the automatic valve closing control ineffective so as to enable the driving shaft to run faster than the driven shaft and in proportion to the torque and load to be driven when the driving shaft is subjected to sudden bursts of speed.

2. In a hydraulic power transmission, a casing constructed to form a receptacle for a fluid, a driven shaft affixed to said casing, a driving shaft extending into said casing, a pump gear affixed to the driving shaft to rotate therewith, a second gear revolvable with the casing and rotatable independently thereof and in mesh with the said first gear, said gears being arranged to circulate fluid within the casing when relative rotation of said shafts occurs, a valve for controlling the circulation of the fluid, and a centrifugal governor external of the casing actuated by the driving shaft for closing said valve when the speed of the driving shaft is increased up to a predetermined rate to cause the rotation of said driven shaft at the same rate of speed as said driving shaft, said valve being automatically yieldable when subjected to pressure above a predetermined pressure for allowing the circulation of the fluid and rendering the action of the governor ineffective so as to enable the driving shaft to run faster than the driven shaft and in proportion to the torque and load to be driven when the driving shaft is subjected to sudden bursts of speed.

3. In a hydraulic power transmission, a casing constructed to form a receptacle for a fluid, a driven shaft affixed to said casing, a driving shaft extending into said casing, a pump gear affixed to the driving shaft to rotate therewith, a second gear revolvable with the casing and rotatable independently thereof and in mesh with the said first gear, said gears being arranged to circulate fluid within the casing when relative rotation of said shafts occurs, a partition within the casing, said gears with said partition dividing the casing into two compartments, one of which forms a pressure chamber and the other a fluid supply reservoir, a by-pass between and communicating with said compartments to relieve excessive fluid pressure in said pressure compartment, a spring loaded valve in said by-pass, a reciprocatory valve within the casing for controlling the circulation of the fluid, and a centrifugal governor external of the casing actuated by the driving shaft for reciprocating said valve to restrict the circulation of the fluid and for stopping the fluid circulation when the speed of the driving shaft is increased up to and above a predetermined rate to cause the rotation of the driving and driven shafts in unison and at the same speed, and means associated with the reciprocatory valve for enabling the valve to adjust itself into different positions to allow the circulation of fluid and rendering the action of the governor on the valve ineffective so as to enable the driving and driven shafts to rotate at different rates of speed in proportion to the load conditions.

4. In a hydraulic power transmission, a casing constructed to form a receptacle for a fluid, a driven shaft affixed to said casing, a driving shaft having a tubular end portion extending into said casing, a pump gear affixed to said tubular end portion of the driving shaft to rotate therewith, a second gear revolvable with the casing and rotatable independently thereof and in mesh with the said first gear, said gears being arranged to circulate fluid within the casing when relative rotation of said shafts occurs, a partition within the casing, said gears with said partition dividing the casing into two compartments, one of which forms a pressure chamber and the other a fluid supply reservoir, a by-pass between and communicating with said compartments to relieve excessive fluid pressure in said pressure compartment, a spring loaded valve in said by-pass, a reciprocatory valve within the bore of said tubular end portion for controlling the circulation of the fluid, and a centrifugal governor external of the casing actuated by the driving shaft for reciprocating said valve to restrict the circulation of the fluid and for stopping the fluid circulation when the speed of the driving shaft is increased up to and above a predetermined rate to cause the rotation of the driving and driven shafts in unison and at the same speed, and means associated with the reciprocatory valve for enabling the valve to adjust itself into different positions to allow the circulation of fluid and rendering the action of the governor on the valve ineffective so as to enable the driving and driven shafts to rotate at different rates of speed in proportion to the load conditions.

5. In a hydraulic power transmission, a casing constructed to form a receptacle for a fluid, a driven shaft affixed to said casing, a driving shaft extending into said casing, a pump gear affixed to the driving shaft to rotate therewith, a second gear revolvable with the casing and rotatable independently thereof and in mesh with the said first gear, said gears being arranged to circulate fluid within the casing when relative rotation of said shafts occurs, a valve for controlling the circulation of the fluid, and a centrifugal governor external of the casing actuated by the driving shaft for closing said valve when the speed of the driving shaft is increased up to a predetermined rate to cause the rotation of said driven shaft at the same rate of speed as said driving shaft, said valve comprising a spring pressed sleeve member automatically yieldable when subjected to pressure above a predetermined pressure for allowing the circulation of the fluid and rendering the action of the governor ineffective so as to enable the driving shaft to run faster than the driven shaft and in proportion to the torque and load to be driven when the driving shaft is subjected to sudden bursts of speed.

6. In a hydraulic power transmission, a casing constructed to form a receptacle for a fluid, a driven shaft affixed to said casing, a driving shaft extending into said casing, a pump gear affixed to the driving shaft to rotate therewith, a second gear revolvable with the casing and rotatable independently thereof and in mesh with the said first gear, said gears being arranged to circulate fluid within the casing when relative rotation of said shafts occurs, a valve for controlling the circulation of the fluid, and a centrifugal governor external of the casing actuated by the driving shaft for closing said valve when the speed of the driving shaft is increased up to a predetermined rate to cause the rotation of said driven shaft at the same rate of speed as said driving shaft, said valve comprising a spring loaded piston automatically yieldable in a direction opposite to its direction of movement by the opening position of the governor when subjected to pressure above a predetermined pressure, for allowing the circulation of the fluid and rendering the action of the governor ineffective so as to enable the driving shaft to run faster than the driven shaft and in proportion to the torque and load to be driven when the driving shaft is subjected to sudden bursts of speed.

7. A hydraulic transmission comprising a hollow driving shaft, a driven shaft, a casing intermediate of said shafts, said casing being attached to the driven shaft and constructed to form a receptacle for a hydraulic fluid, intermeshing pump gears within the casing arranged to circulate the fluid therein when relative rotation of said shafts occurs, one of said gears being fixed to said driving shaft to rotate therewith, a valve within and movable axially of said driving shaft for controlling this circulation of the said fluid, and a centrifugal governor external of the casing actuated by the rotational speed of the driving shaft to control the closing of said valve as the speed of the driving shaft is increased up to a predetermined rate to prevent fluid circulation and lock the two shafts together whereby said driven shaft will rotate at the same rate of speed as the driving shaft, said valve being arranged to be yieldable when not fully closed and subjected to pressure above a predetermined value to move automatically to a more opened position independently of the action of the governor on said valve so as to allow a greater circulation of the fluid and permit the driving member to run faster than the driven shaft in proportion to the torque and the load conditions encountered.

8. In a hydraulic power transmission, a casing constructed to form a receptacle for a hydraulic fluid, a driven shaft affixed to said casing, a driving shaft having a hollow end portion extending into said casing and provided with ports through its wall portion, a pump gear fixed on the said hollow end portion of the driving shaft to rotate therewith, said pump gear having a plurality of radially arranged passages therethrough for communication with said ports during rotation of the said pump gear, a second pump gear revolvable with the casing and rotatable independently thereof and in mesh with the said first gear, a pocket into which fluid is pumped by said pump gears when relative rotation of said shafts occurs, a centrifugal governor, and a valve device within and reciprocable axially of said hollow end portion of the drive shaft for controlling passage of fluid through said ports, said valve device comprising a valve rod, weighted arms pivotally arranged on said driving shaft and actuated by the rotational speed of said shaft, cam members carried by said arms and movable therewith, a member rotatable with said driving shaft and having a flange provided with a plurality of holes equidistant from the center of the flange, reciprocable rods having one end headed and bearing on said cams and the other end portion slidably supported in the holes of said flange and rigidly connected at their ends to said valve rod, springs between the headed portions of said reciprocable rods and said flange, a sleeve slidable on a reduced portion of the inner end of said valve rod, and a spring on the valve rod behind the rear face of said sleeve and of sufficient force to prevent sliding movement of said sleeve relative to said rod during closing of the valve by the action of the weighted arms but permitting the sleeve to slide relative to said valve rod when a resistance to the closing movement of the valve is encountered in excess of the pressure of the spring acting upon said sleeve for allowing the circulation of the fluid and rendering the closing of the weighted arms ineffective to permit the driving shaft to run faster than the driven shaft and in proportion to the torque and load to be driven, the said springs associated with said reciprocable rod connections acting to open the valve as the rotational speed of the driving shaft drops below a normal speed for a direct drive.

9. In a hydraulic power transmission, a driven shaft; a casing attached to the end of the driven shaft and provided with a pump chamber, a pressure chamber and a storage chamber for the liquid to be pumped; a driving shaft coaxial with said casing and the driven shaft and having a tubular end portion extending into the pump chamber of said casing; rotary pump gears in intermeshing engagement within said pump chamber for pumping liquid from said storage chamber into said pressure chamber, one of said pump gears being fast to said driving shaft and provided with a plurality of radial passages in registry with a plurality of circumferentially arranged ports through the tubular wall portion of the driving shaft, the other of said pump gears being carried by the casing and arranged to be freely rotatable thereon; a shiftable piston valve arranged for reciprocation within and axially of the tubular portion of the driving shaft for opening and closing said ports thereof to control the movement of the pumped fluid from said pressure chamber through said passages of said pump gear and said ports to the suction side of the pump gears, and to prevent the circulation of liquid and lock the two shafts together when the speed of the driven shaft reaches that of the driving shaft; and means disposed exteriorly of said casing actuated by the rotational speed of said driving shaft for shifting said valve relative to said ports, said means including weighted arms pivotally arranged on the driving shaft, cam members carried by and movable with said arms, and spring-pressed members bearing at one end on said cams and operatively connected at the other end to said valve and being arranged to be reciprocated by the rotation of said cams to open and close said valve.

10. In a hydraulic power transmission, a driven shaft; a rotatable casing attached to the end of the driven member and provided with a pump chamber, a pressure chamber and a storage chamber for the liquid to be pumped; a positively rotated driving shaft coaxial with said casing and having a tubular end portion extending through said pump chamber of said casing; rotary pump gears in intermeshing engagement within said pump chamber for pumping liquid from said storage chamber into said pressure chamber, one of said pump gears being fast to said driving shaft and provided with a plurality of radial passages in registry with a plurality of circumferentially arranged ports through the tubular wall portion of the driving shaft, the other of said pump gears being carried by the casing and arranged to be freely rotatable thereon, a shiftable valve arranged for reciprocation within and axially of the tubular portion of said driving shaft for opening and closing said ports thereof to control the movement of the pumped fluid from said pressure chamber through said passages of said pump gear and said ports to the suction side of the pump gears, and to prevent the circulation of liquid and lock the two shafts together when the rotational speed of the driven shaft reaches that of the driving shaft; means disposed exteriorly of said casing actuated by the rotational speed of said driving shaft for shifting said valve relative to said ports; said means including centrifugal weights pivotally arranged on the driving shaft, cam members actuated by said weights, and spring-pressed members bearing at one end on said cams and operatively connected at the other end to said valve and being arranged to be reciprocated by the rotation of said cams to open and close said valve, said valve being arranged when not fully closed to be moved to a more opened position when the pressure of liquid caught in the space of the tubular portion of the driving shaft ahead of said valve and opposing its closing movement by the action of said weights reaches a predetermined value; and means for conducting the entrapped liquid to said storage chamber from the space ahead of said valve when the valve reaches a predetermined point in its closing movement under the normal centrifugal action of the weighted arms.

JOHN T. CORRIGAN.